United States Patent [19]
Morris

[11] Patent Number: 6,161,757
[45] Date of Patent: Dec. 19, 2000

[54] PATIENT PROTOCOL CARD

[75] Inventor: Tony J. Morris, Marietta, Ga.

[73] Assignee: Neotonus, Inc., Marietta, Ga.

[21] Appl. No.: 09/400,397

[22] Filed: Sep. 21, 1999

[51] Int. Cl.⁷ .................................................. G06K 17/00
[52] U.S. Cl. ........................................ 235/375; 235/492
[58] Field of Search ..................................... 235/375, 492

[56] References Cited

U.S. PATENT DOCUMENTS 5,451,763  9/1995  Pickett et al. ........................... 235/492

*Primary Examiner*—Harold I. Pitts
*Attorney, Agent, or Firm*—Levisohn, Lerner, Berger & Langsam

[57] ABSTRACT

A Patient Protocol Card ("PPC") is provided on which a physician may store the information required for a prescribed treatment, for example, the patient's name, prescribed intensity of the treatment, duration of different phases of the treatment, and number of treatments. PPC may then be used to initiate and control the work of the device administering the prescribed treatment. To initiate the procedure and to convey required information to a control unit, the card is inserted into a card receptacle of the control unit, which preferably incorporates a card reading mechanism. When the treatment information is conveyed, the control unit administers the procedure in accordance with the physician's prescription. In the preferred embodiment, there are three versions of the PPC: a clinician card, a patient card, and a physician card. The clinician card initializes the control unit to begin treatment. The patient card contains the patient's name, treatment protocol, and treatment number. In one embodiment, for safety, operation of the device can not occur without both the clinician and patient protocol card. The physician card allows the system to be operated in a totally manual, i.e. overriding mode. All treatment settings are available for adjustment when the physician card is inserted.

18 Claims, 2 Drawing Sheets

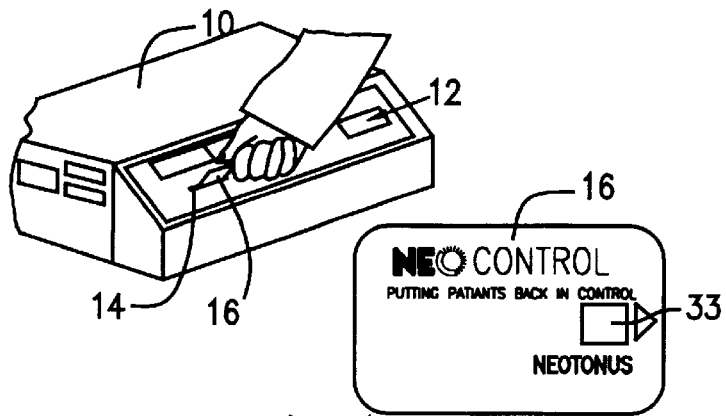
FIG. 1
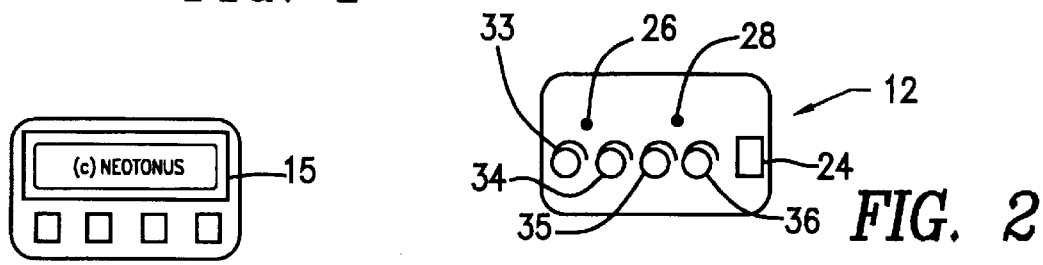
FIG. 3   FIG. 2
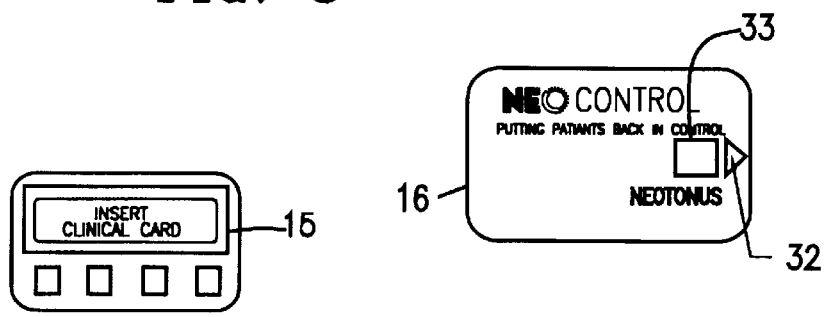
FIG. 4   FIG. 5
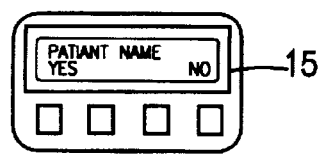   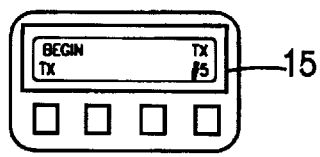
FIG. 6   FIG. 8

PATIENT PROTOCOL CARD

FIELD OF THE INVENTION

The present invention relates to a method and an apparatus for administering medical procedures. More specifically, the present invention relates to a Patient Protocol Card (PPC), which, in the preferred embodiment, has the appearance of a credit card, incorporates a small memory chip and is capable of storing and conveying relevant information about a patient and parameters for a treatment device responsible for administering a prescribed, patient-specific, medical procedure, when the card is inserted into a corresponding receptacle of the treatment device. The card controls the use of the treatment device to ensure the proper treatment parameters are provided to the current patient.

BACKGROUND OF THE INVENTION

Medical treatment utilizing a variety of electronic equipment is becoming increasingly popular among physicians and their patients. Typically, the parameters of such treatment are prescribed by a physician, written onto a patient's chart and then implemented, either with one or a plurality of treatments, by a medical technician operating the treating equipment. At any stage of this process, a human error or any other mistake is possible which may be detrimental to the patient's health. To avoid the possibility of such error, the present system allows a technician or the physician to store data related to the patient and the prescribed treatment plan onto a Patient Protocol Card (PPC). Use of the PPC conveys the treatment data to the electronic equipment providing or controlling the medical procedure and to the actual treatment apparatus. If more than one treatment-session is prescribed, the PPC will monitor and control the apparatus to ensure that the patient does not receive too frequent treatments or non-prescribed treatments or parameters. The treatment protocol is coordinated to the patient's identity to ensure accuracy and eliminate potential health risks.

The present invention contemplates three versions of the PPC: a clinician card; a patient card; and a physician card. The clinician card initializes the treatment unit to begin the prescribed medical procedure. The patient card, intended to be inserted either after the clinician card or in a separate reader slot, may contain the patient's name, the specific, prescribed treatment protocol (total time duration of each treatment, parameters of each treatment, e.g., $H_2$, time-on, time-off, intensity; frequency and total number of treatments, etc.), and the then applicable treatment number. The physician card overrides the patient and/or clinician card and allows the system to be operated in a totally manual mode, i.e., all parameters may be hand-adjusted using the equipment controls. All settings of the equipment, including the treatment protocol, are available for adjustment when the physician card is inserted.

SUMMARY OF THE INVENTION

It is an object of the present invention to provide a system which will allow a physician to store patient related information, including the details of a medical treatment protocol, in an electronic form.

It is another object of the present invention to provide an electronic card or other memory storage device for storing patient related information and medical apparatus treatment parameters, which may be later used to initiate and control the prescribed patient's treatment on a piece of associated medical equipment.

Other objects, advantages and features of this invention will become more apparent hereinafter.

In the preferred embodiment, the invention is intended to operate and control a medical treatment system for non-invasive magnetic nerve stimulation of pelvic floor musculature. This procedure is intended to treat certain types of incontinence. Such a system is available from Neotonus, Inc. of Marietta, Ga. 30067. The invented system operates by use of a Patient Protocol Card (PPC) which is similar in appearance to a credit card and incorporates a small memory chip or a magnetic strip. After a suitable physical exam and history are taken, assuming the patient is prescribed a medical treatment by use of the treatment apparatus, the physician initially stores the information required for the prescribed procedure on the PPC, for example, by entering the protocol information into a card creator, which information is then stored on the magnetic strip or the memory chip of the card. The patient's name, the prescribed intensity of the magnetic field, the duration of different phases of the treatment, the total number of prescribed treatments, the frequency of treatments, etc. (collectively referred to as "treatment protocol") are all magnetically embedded or otherwise stored on the patient's card. The card is then given to the patient or stored on premises of the equipment. The card is needed to initiate and control the magnetic nerve stimulator or other piece of electronic hospital equipment when the patient arrives for his treatment.

In another embodiment, there may be three versions of the PPC: a clinician card, a patient card, and a physician card. The clinician card initializes the medical equipment to begin treatment. The clinician may then operate the machine manually, so long as a patient card is also "read" by the machine. The patient card contains the patient's name, treatment protocol, and treatment number. The patient card is either inserted after the clinician's card or, alternatively, two reading slots are provided with the machine for reading the cards simultaneously. The physician card, on the other hand, allows the system to be operated in a totally manual mode, when all treatment settings may be adjusted or interrupted, manually, so long as the physician card is inserted into the card reader.

BRIEF DESCRIPTION OF THE DRAWINGS

A full understanding of the invention can be gained from the following description of the preferred embodiment when read in conjunction with the accompanying drawings in which:

FIG. 1 is a perspective view of the card reading control unit, showing a card being manually inserted, controlling functioning of the electronic portion of the treatment equipment; with a detailed and enlarged front view of a Patient Protocol Card;

FIG. 2 is an enlarged front view of the front panel of the control unit of FIG. 1, with its knobs and a switch visible, for the manual control of the equipment;

FIG. 3 is a front, enlarged view of the LCD display screen of the control unit of FIG. 1, displaying a "boot-up" message;

FIG. 4 is front, enlarged view of the display screen of FIG. 3, similar to FIG. 3, yet displaying the initial message before the start of a medical treatment procedure;

FIG. 5 is a front, enlarged view of the preferred embodiment of the Patient Protocol Card in accordance with the present invention;

FIG. 6 is a front, enlarged view of the display screen of FIG. 3, displaying a request for patient's name verification, after the patient PPC has been inserted into the card reader and the name (not shown) stored on the card is displayed; the inquiry shows the "yes" and "no" buttons to be selectively pushed if the stored name on the card matches the identity of the patient;

FIG. 8 is a front, enlarged view of the display screen of FIG. 3 displaying a message to begin the, procedure and indicating that "TX (or Treatment) #5" is to begin, for example;

DETAILED DESCRIPTION OF THE PREFERRED EMBODIMENT AND THE DRIVINGS

Figure 7:
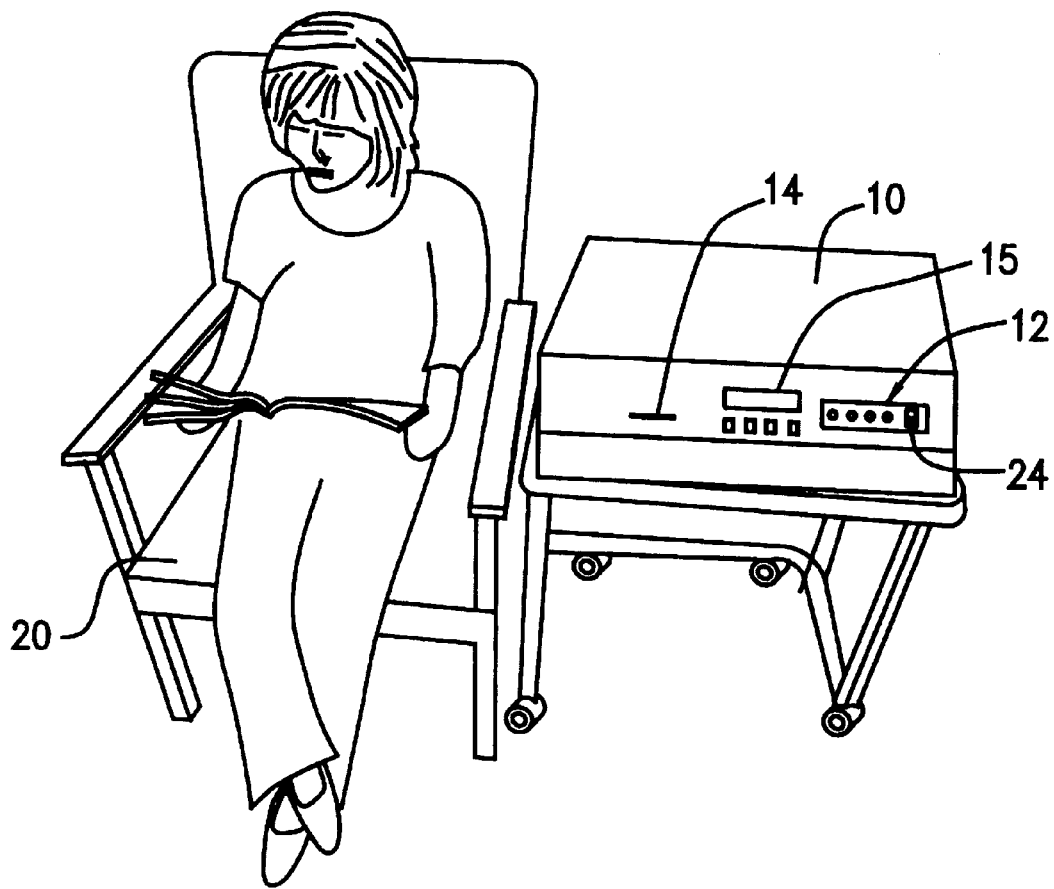
FIG. 7 is a front perspective view of a patient receiving medical treatment in accordance with a protocol recorded on a Patient Protocol Card; this figure shows the use of a magnetic nerve stimulator embedded into a chair with the electronics controlled by the apparatus adjacent to the chair and the PPC of the present invention.

In accordance with one preferred embodiment of the present invention, as shown in FIG. 1, an electronic control unit 10 is provided which controls a therapy device 20 (See FIG. 7) responsible for administering a prescribed treatment to a patient. The control unit is equipped with a slot or card reader/receptacle 14, a display 15, and a set of knobs 12 allowing for a manual control of the control unit. The system operates by use of a Patient Protocol Card (PPC) 16 which has the appearance and size of a credit card and incorporates a magnetic strip or a small memory chip 33, preferably on one side of the card. See FIG. 5. Physicians record the patient care and treatment information, the treatment protocol, required for the prescribed procedure on the PPC, for example, the patient's name, prescribed intensity of the treatment, duration of different phases of the treatment, and treatment number. The information may be inputted onto the card by any appropriate device known to those skilled in the art, similar to embedding information on a bank card or a credit card. The card 16 may then be used to initiate and control the work of the device administering the prescribed treatment. To initiate the procedure and to convey required information to the control unit 10, the card 16 is inserted into the slot of the receptacle 14, which preferably incorporates a magnetic strip or a memory chip reading mechanism (not shown). When the patient name and treatment information or protocol is read, the control unit administers the procedure to the named patient in accordance with the physician's prescription.

In the preferred embodiment, there are actually three versions of the PPC: a clinician card, a patient card, and a physician card. In this embodiment, either the control unit 10 is provided with two card readers, one for the clinician card, the other for the patient card, or the two card are inserted into the single card reader, one after another. The clinician card initializes the control unit to begin treatment. The patient card contains the patient's name, treatment protocol, and treatment number. The physician card, readable in either slot if two reader slots are provided, allows the system to be operated in a totally manual, override mode. With a physician card, all treatment settings are available for adjustment using the knobs on the front panel. Properly trained medical personnel may be given clinician cards to initiate the prescribed treatment. Although, technically, a patient PPC may be given and, in one embodiment, its possession provides the capability to initiate treatment, for safety reasons, it is preferred that patients not be able to initiate the treatment without proper medical supervision. This necessitates the insertion of both a patient and a clinician card. In the preferred embodiment, when the physician card is inserted, it allows the physician to override the patient protocol and the system and to change the sequence and/or duration of the treatment, as desired. For example, in designing a prescription, the physician may see the comfort level of the patient at various parameters. Or, if a patient feels discomfort while the treatment is in progress, the physician PPC may be inserted to stop the treatment or to change its parameters. As a precaution, however, the treatment apparatus is provided with a safety mechanism to shut-off, discontinue treatment and/or reduce treatment, as required, should discomfort or a problem arise, independent of which the card is within the card reader.

In the preferred embodiment, the invention works in connection with a device intended to provide non-invasive magnetic nerve stimulation of pelvic floor musculature. As shown in FIG. 7, the electronic control unit 10 is connected to a therapy head located under the seat of the chair 20. The control unit provides operator interface or display 15, which displays messages, e.g. , patient's name, prompt and the parameters of the basic system control, time of treatment, Hz, time "on" and "off", treatment number, etc.; system status, external communications, and pulse generation. The system use begins by first turning on a Main Power switch located on the upper left rear corner of the control unit (not shown). The Head Power switch 24, located on the control unit's front panel, is toggled "on," next. Both the Main Power and the Head Power green indicator lights 26 and 28 will then be illuminated. See FIG. 2. FIG. 3 shows the temporary "boot-up" information that appears on the display screen 15 of the control unit 10. This "boot-up" data will appear for approximately 5 seconds, and then the screen will automatically display "Insert Clinician Card." See FIG. 4. To initialize patient treatment, the clinician card should then be inserted into card reader slot 14, face up with memory chip 33 and arrow 32 toward the control unit, as shown in FIGS. 1 and 5. The card should be inserted fully into the slot until the card is seated and a "detente" is felt. If "Invalid Card" message appears on the display screen, the operator should check to make sure the card is properly inserted.

When the clinician card is accepted, it can be removed and the message "Insert Patient Card" will appear on the screen. A prescribing physician has, as mentioned, already stored the information required for the prescribed procedure on the patient PPC, for example, the patient's name, prescribed intensity of the magnetic field, duration of different phases of the treatment, power intensity, Hz, and treatment number, etc., i.e. the patient protocol. The card may then be inserted to initiate and control the work of the magnetic nerve stimulator. The patient PPC is identical to clinician and physician PPC in its appearance, they only differ in the information they store and the ability to control the machine's operating parameters. The patient card, containing treatment information unique to a particular patient, the treatment protocol, should then be inserted into the card reader slot 14 and the patient's name will appear on the screen. See FIG. 6. The clinician should verify correspondence between the name of the patient prepared to receive treatment and the name embedded on the card (depressing "Yes" or "No" button beneath the corresponding word); See FIG. 6, and remove the card if the name of the actual patient is different from the name appearing on the display screen. The next message "Begin TX" will appear on the screen (if "yes" to the preceding inquiry was depressed) and, to start a treatment, the "yes" button beneath this text should be depressed. See FIG. 8. The control unit will then implement the patient protocol encoded on the PPC. The PPC programmed protocol is based on the physician's prescription and may be different from a general protocol. For safety reasons, it is preferred that, once the protocol is encoded on the PPC, it can not be changed unless done so by the physician on the PPC input device which requires, for safety, the physician card, too. To implement a new treatment protocol, the physician will issue a new card to a patient. At any time during the procedure, the treatment may be interrupted and the protocol changed by inserting a physician PPC into the reader slot 30. For safety reasons, too, the machine can be turned off or power/intensity decreased, if discomfort is present, irrespective of the card in the reader. Control knobs 33 36 may be used with the physician PPC to manually continue the treatment.

Figure 9:
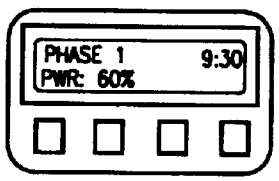
FIG. 9 is a front, enlarged view of the display screen of FIG. 3 displaying that Phase 1 of the treatment session will be at 60% power and that 9:30 remains in Phase 1 (the time counting down during the treatment)
Figure 10:
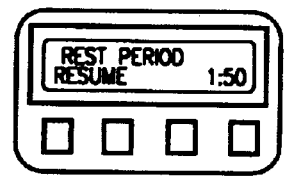
FIG. 10 is a front, enlarged view of the display screen of FIG. 3 displaying that a rest period of 1:50 remains before Phase 2 begins.

FIGS. 9 and 10 show typical displays of the device when used with a magnetic nerve stimulating device, as shown in FIG. 7. FIG. 9 illustrates, for example, that Phase 1 is in progress, that 9½ minutes are left for the phase of treatment and that power is 60% is being provided to the magnetic head under the chair, consistent with the physician's prescribed treatment. After the conclusion of Phase 1, the magnetic nerve stimulator has a rest period before the commencement of Phase 2 of the treatment. FIG. 10 shows a typical display, illustrating that the machine is currently in the rest mode and that Phase 2 treatment will begin in about 1 minute and 50 seconds.

Having described this invention with regard to specific embodiments, it is to be understood that the description is not meant as a limitation since further variations or modifications may be apparent or may suggest themselves to those skilled in the art. It is intended that the present application cover such variations and modifications as fall within the scope of the appended claims.

I claim as follows:

1. A system for administering medical treatment comprising:
    a patient protocol card;
    a control unit, further comprising a card reading receptacle;
    wherein information relevant to said medical treatment is recorded on said patient protocol card, said patient protocol card being readable by said card reading receptacle, said information recorded on said patient protocol card being transmitted to said control unit when said card is inserted into said card reading receptacle and wherein said control unit controls administration of said medical treatment based on said information.

2. A system for administering medical treatment as claimed in claim 1, wherein said patient protocol card further comprises a memory chip or magnetic strip and wherein said information relevant to said medical treatment is recorded on said memory chip or magnetic strip.

3. A system for administering medical treatment as claimed in claim 1 further comprising a clinician card, wherein information relevant to initiation of said medical treatment is recorded on said clinician card, said clinician card being readable by said card reading receptacle, and wherein said information recorded on said clinician card is transferred to said control unit when said clinician card is inserted into said card reading receptacle.

4. A system for administering medical treatment as claimed in claim 1 further comprising a physician card, wherein, said physician card being readable by said card reading receptacle, and wherein said physician card allows manual control of said control unit when said physician card is inserted and read by said card reading receptacle.

5. A system for administering medical treatment as claimed in claim 3, wherein both said patient protocol card and said clinician card are required to provide said medical treatment to a patient.

6. A system for administering medical treatment as claimed in claim 1, wherein said information relevant to said medical treatment is unchangeably recorded on said patient protocol card.

7. A system for administering medical treatment as claimed in claim 1, wherein said patient protocol card further comprises the general appearance and size of a credit/debit card.

8. A system for administering medical treatment as claimed in claim 1 further comprising a medical treatment device, wherein said medical treatment device is connected to said control unit, and wherein said medical treatment device administers said medical treatment.

9. A system for administering medical treatment as claimed in claim 8 wherein said medical treatment device is a magnetic nerve stimulator.

10. A system for administering medical treatment as claimed in claim 1 wherein said medical treatment is the magnetic nerve stimulation of pelvic floor musculature.

11. A method for controlling administration of a medical treatment by a treatment device comprising the steps of:
    a. storing patient prescriptive protocol information relevant to said medical treatment on a patient protocol card; and
    b. controlling administration of said medical treatment by transmitting said information stored on said patient protocol card to said treatment device.

12. A method for controlling administration of a medical treatment as claimed in claim 11 further comprising a step of storing information relevant to initiation of said medical treatment on a separate, clinician card, wherein said treatment device is inoperable without both said patient protocol card and said clinician card.

13. A method for controlling administration of a medical treatment as claimed in claim 11 further comprising a step of overriding said patient protocol card by using a physician card.

14. A method for controlling administration of a medical treatment as claimed in claim 13 further comprising a step of controlling administration of said medical treatment by transmitting information stored on said physician card to said treatment device for administering said medical treatment.

15. A method for controlling administration of a medical treatment as claimed in claim 14 further comprising a step of overriding administration of said medical treatment as controlled by said patient protocol card by using said physician card.

16. A method for controlling administration of a medical treatment as claimed in claim 14 further comprising a step of switching to a manual control means over administration of said medical treatment by said information stored on said patient protocol card.

17. A method for controlling administration of a medical treatment as claimed in claim 11 wherein said treatment device is a magnetic nerve stimulator.

18. A method for controlling administration of a medical treatment as claimed in claim 11 wherein said medical treatment is magnetic nerve stimulation of pelvic floor musculature.

\* \* \* \* \*